(12) United States Patent
Wu

(10) Patent No.: US 9,941,587 B2
(45) Date of Patent: Apr. 10, 2018

(54) 3×3 BUTLER MATRIX AND 5×6 BUTLER MATRIX

(71) Applicant: GUANGDONG BROADRADIO COMMUNICATION TECHNOLOGY CO., LTD., Guangdong (CN)

(72) Inventor: Biqun Wu, Guangzhou (CN)

(73) Assignee: GUANGDONG BROADRADIO COMMUNICATION TECHNOLOGY CO., LTD., Guangzhou (CN)

( * ) Notice: Subject to any disclaimer, the term of this patent is extended or adjusted under 35 U.S.C. 154(b) by 346 days.

(21) Appl. No.: 14/766,980

(22) PCT Filed: Jul. 12, 2013

(86) PCT No.: PCT/CN2013/079274
§ 371 (c)(1),
(2) Date: Aug. 10, 2015

(87) PCT Pub. No.: WO2015/003381
PCT Pub. Date: Jan. 15, 2015

(65) Prior Publication Data
US 2015/0380817 A1   Dec. 31, 2015

(51) Int. Cl.
*H01Q 3/40* (2006.01)
*H04Q 3/42* (2006.01)
(Continued)

(52) U.S. Cl.
CPC .............. *H01Q 3/40* (2013.01); *H01P 1/184* (2013.01); *H01P 5/227* (2013.01); *H04Q 3/42* (2013.01)

(58) Field of Classification Search
CPC .. H01Q 3/40; H01Q 3/42; H01Q 3/52; H01Q 3/523; H01P 1/18; H01P 1/184;
(Continued)

(56) References Cited

U.S. PATENT DOCUMENTS 3,295,134 A * 12/1966 Lowe ................. H01Q 3/40
                                                          333/101
4,231,040 A * 10/1980 Walker ................ H01Q 3/40
                                                          342/373
(Continued)

FOREIGN PATENT DOCUMENTS

CN           101599784 A        12/2009
CN           102195696 A         9/2011
(Continued)

*Primary Examiner* — Gregory C. Issing
*Assistant Examiner* — Daniel P Malley, Sr.
(74) *Attorney, Agent, or Firm* — Gokalp Bayramoglu

(57) ABSTRACT

The present invention relates to a 3×3 Butler matrix, comprising a first directional coupler, a second directional coupler, a third directional coupler, a first fixed phase shifter, a second fixed phase shifter and a third fixed phase shifter; and also relates to a 5×6 Butler matrix, comprising a first 3×3 Butler matrix, a second 3×3 Butler matrix, a fourth directional coupler, a fifth directional coupler, a power divider, a fourth fixed phase shifter and a fifth fixed phase shifter. The 3×3 Butler matrix and the 5×6 Butler matrix provided in the present invention have the features of small size, wide frequency band, low loss, high isolation and stable performance, fill the blank of specific technical schemes about the 3×3 Butler matrix and the 5×6 Butler matrix in the prior art, and have broad application prospects and great value.

4 Claims, 10 Drawing Sheets

(51) Int. Cl.
*H01P 1/18* (2006.01)
*H01P 5/22* (2006.01)

(58) Field of Classification Search
CPC .... H01P 1/182; H01P 5/12; H01P 5/16; H01P 5/18; H01P 5/182; H01P 5/184; H01P 5/227

See application file for complete search history.

(56) References Cited

U.S. PATENT DOCUMENTS

| | | | | |
|---|---|---|---|---|
| 4,641,142 | A * | 2/1987 | Greying | G01S 1/48 342/399 |
| 5,812,088 | A * | 9/1998 | Pi | H01Q 3/26 342/373 |
| 6,480,524 | B1 * | 11/2002 | Smith | H04B 7/0408 342/373 |
| 2009/0108930 | A1 * | 4/2009 | Gandhi | H03F 3/602 330/124 R |
| 2009/0184879 | A1 * | 7/2009 | Derneryd | H01Q 1/52 343/853 |
| 2013/0076565 | A1 | 3/2013 | Lee et al. | |
| 2013/0265197 | A1 * | 10/2013 | Jones | H01Q 1/246 342/373 |
| 2017/0149396 | A1 * | 5/2017 | Clarke | H03F 3/602 |

FOREIGN PATENT DOCUMENTS

| | | |
|---|---|---|
| CN | 103022700 A | 4/2013 |
| CN | 103414022 A | 11/2013 |
| CN | 203386900 U | 1/2014 |

\* cited by examiner

| No. | Freq(GHz) | dB[S(1,4)] | Ang[S(1,4)] | dB[S(1,5)] | Ang[S(1,5)] | dB[S(1,6)] | Ang[S(1,6)] |
|---|---|---|---|---|---|---|---|
| 1 | 1.71000000 | -5.0026056390 | -173.0414354200 | -5.0081508569 | -172.3943021600 | -4.9321546261 | -172.4152807200 |
| 2 | 1.79000000 | -4.7513947591 | 138.6858086000 | -4.9850262780 | 138.8284460200 | -5.1985794170 | 138.4341927700 |
| 3 | 1.86000000 | -4.6522929195 | 96.8695923840 | -4.9984621459 | 96.9728872550 | -5.3370836257 | 96.4795769030 |
| 4 | 1.94000000 | -4.6466923369 | 49.4282747560 | -4.9800134724 | 49.5205707160 | -5.3921705867 | 49.0510426350 |
| 5 | 2.01000000 | -4.7054631726 | 7.9610480358 | -4.9759187852 | 7.8979550469 | -5.3480176124 | 7.7356193940 |
| 6 | 2.09000000 | -4.8764307156 | -39.8457496280 | -4.9652600645 | -40.0238107950 | -5.1582819864 | -39.8792410470 |
| 7 | 2.17000000 | -5.2552394690 | -88.3979002410 | -4.9608263436 | -88.9700675950 | -4.8911917163 | -88.7961975670 |

| No. | Freq(GHz) | dB[S(2,4)] | Ang[S(2,4)] | dB[S(2,5)] | Ang[S(2,5)] | dB[S(2,6)] | Ang[S(2,6)] |
|---|---|---|---|---|---|---|---|
| 1 | 1.71000000 | -5.0170796326 | 109.8194653400 | -4.9922652876 | -9.5221694546 | -5.0262663578 | -130.1234955300 |
| 2 | 1.79000000 | -5.0012436300 | 57.4681227120 | -5.0619276242 | -64.2809958290 | -4.9333172781 | 177.8428472100 |
| 3 | 1.86000000 | -5.0127997818 | 12.4614604820 | -5.1187338699 | -110.5299943800 | -4.9272558626 | 133.0192654100 |
| 4 | 1.94000000 | -5.0011447721 | -38.6706715920 | -5.1193607950 | -162.1096539200 | -4.9414569384 | 81.9374665330 |
| 5 | 2.01000000 | -4.9937158409 | -83.5241207160 | -5.0770377549 | 153.4118303300 | -4.9793915765 | 36.9756282660 |
| 6 | 2.09000000 | -4.9809539658 | -135.0719695100 | -5.0319060974 | 102.9907162300 | -5.0332653078 | -15.1329552140 |
| 7 | 2.17000000 | -4.9796906146 | 172.3300352600 | -5.0369293979 | 52.9624194480 | -5.1164035293 | -69.0414356890 |

| No. | Freq(GHz) | dB[S(3,4)] | Ang[S(3,4)] | dB[S(3,5)] | Ang[S(3,5)] | dB[S(3,6)] | Ang[S(3,6)] |
|---|---|---|---|---|---|---|---|
| 1 | 1.71000000 | -4.9481203550 | 19.9571811830 | -5.0276932704 | 140.0289920500 | -5.0005111272 | -100.2304445800 |
| 2 | 1.79000000 | -5.2105550277 | -32.4671215220 | -4.9333486261 | 98.3195464470 | -4.6334560132 | -152.2021301200 |
| 3 | 1.86000000 | -5.3453061119 | -77.6585212400 | -4.9284576993 | 43.4976088320 | -4.7369351221 | 163.0432608500 |
| 4 | 1.94000000 | -5.4082721808 | -128.9254209600 | -4.9476253252 | -7.7388012035 | -4.6945553918 | 112.0031389100 |
| 5 | 2.01000000 | -5.3645140398 | -173.6157667900 | -4.9878474833 | -52.8946430960 | -4.7299672141 | 67.1733903350 |
| 6 | 2.09000000 | -5.1726075976 | 134.9332483200 | -5.0429336799 | -105.1857353100 | -4.8543210501 | 15.3026678460 |
| 7 | 2.17000000 | -4.8021149464 | 82.3447192540 | -5.1242719606 | -159.1355300000 | -5.1454077746 | -38.1273133480 |

Figure 5

| No. | Freq(GHz) | dB[S(1,6)] | dB[S(1,7)] | dB[S(1,8)] | dB[S(1,9)] | dB[S(1,10)] | dB[S(1,11)] |
|---|---|---|---|---|---|---|---|
| 1 | 1.71000000 | -8.2165542728 | -8.1006956906 | -8.1389847507 | -8.0144048875 | -8.2171645032 | -8.0886851507 |
| 2 | 1.86000000 | -7.6606263540 | -7.9837918214 | -8.3407457672 | -8.6563328498 | -8.0018123260 | -8.3126634244 |
| 3 | 1.94000000 | -7.6442997804 | -8.0316681576 | -8.3721453745 | -8.7528596421 | -7.9805991156 | -8.3396572110 |
| 4 | 2.01000000 | -7.7122197822 | -8.0171157057 | -8.3648797076 | -8.6799702391 | -7.9919763707 | -8.3056892471 |
| 5 | 2.09000000 | -7.9678724440 | -8.1153634025 | -8.2516701900 | -8.4004331185 | -8.0592785170 | -8.2114339617 |
| 6 | 2.17000000 | -8.5146657282 | -8.4000941300 | -8.1425152734 | -8.0153542821 | -8.2175790494 | -8.0846418346 |

| No. | Freq(GHz) | Ang[S(1,6)] | Ang[S(1,7)] | Ang[S(1,8)] | Ang[S(1,9)] | Ang[S(1,10)] | Ang[S(1,11)] |
|---|---|---|---|---|---|---|---|
| 1 | 1.71000000 | -20.8056447272 | -20.1732157827 | -20.2551443044 | -19.5942998532 | -20.2862550109 | -19.6843531946 |
| 2 | 1.86000000 | -174.6587733745 | -174.4009669793 | -174.9319387087 | -174.6588978825 | -174.5405879874 | -174.1659065452 |
| 3 | 1.94000000 | 104.4896474945 | 105.2246410297 | 104.0447274821 | 104.6825080960 | 104.5064180292 | 105.1117126053 |
| 4 | 2.01000000 | 33.6932413248 | 34.7095196426 | 33.4274520282 | 34.4135893615 | 33.5776849466 | 34.4702072909 |
| 5 | 2.09000000 | -47.8877069799 | -46.7683045325 | -47.8967000176 | -46.7966882085 | -46.0517920604 | -46.9554704741 |
| 6 | 2.17000000 | -130.7127190974 | -129.7202439973 | -131.0851956863 | -130.2344483832 | -131.1421257987 | -130.0877362784 |

| No. | Freq(GHz) | dB[S(2,6)] | dB[S(2,7)] | dB[S(2,8)] | dB[S(2,9)] | dB[S(2,10)] | dB[S(2,11)] |
|---|---|---|---|---|---|---|---|
| 1 | 1.71000000 | -8.2130940971 | -8.1118236029 | -8.2232524666 | -8.1178132210 | -8.1842746344 | -8.0832356745 |
| 2 | 1.86000000 | -8.0209252158 | -8.3361882363 | -7.9358697805 | -8.2661680129 | -8.1178866595 | -8.4518422847 |
| 3 | 1.94000000 | -8.0193170023 | -8.3352800263 | -7.9471009530 | -8.3042240069 | -8.1360329822 | -8.4601496966 |
| 4 | 2.01000000 | -8.0115934328 | -8.3284596238 | -8.0033481191 | -8.3036205475 | -8.1039836130 | -8.3831417280 |
| 5 | 2.09000000 | -8.0809188063 | -8.2405512780 | -8.1308371035 | -8.2749375885 | -8.1237567010 | -8.2750668600 |
| 6 | 2.17000000 | -8.2418806459 | -8.0892073516 | -8.3633382669 | -8.2051505552 | -8.2788488679 | -8.1795866564 |

| No. | Freq(GHz) | Ang[S(2,7)] | Ang[S(2,8)] | Ang[S(2,9)] | Ang[S(2,10)] | Ang[S(2,11)] |
|---|---|---|---|---|---|---|
| 1 | 1.71000000 | -97.5168703144 | -37.4404358390 | 22.6638719582 | 83.1713409980 | 143.2211602848 |
| 2 | 1.86000000 | 101.4404984194 | 161.9928523629 | -138.1151659510 | -81.6466005758 | -21.6511133861 |
| 3 | 1.94000000 | 16.9189271503 | 77.4362698096 | 137.6712238163 | -166.6877198623 | -106.3365394754 |
| 4 | 2.01000000 | -57.0032399777 | 3.1316982075 | 63.6222181123 | 119.6100019069 | 179.9464190621 |
| 5 | 2.09000000 | -142.0070126041 | -82.7078396919 | -22.0589763155 | 35.4364430037 | 96.0281152226 |
| 6 | 2.17000000 | 131.0692258855 | -170.5826092932 | -110.3457286090 | -48.7358783810 | 12.0312328869 |

| No. | Freq(GHz) | dB[S(3,6)] | dB[S(3,7)] | dB[S(3,8)] | dB[S(3,9)] | dB[S(3,10)] | dB[S(3,11)] |
|---|---|---|---|---|---|---|---|
| 1 | 1.71000000 | -8.1404602105 | -8.2160934971 | -8.1246007982 | -8.2320621824 | -8.1084671211 | -8.2005397358 |
| 2 | 1.86000000 | -8.3048719775 | -8.0217002864 | -8.2386836482 | -7.9424132121 | -8.4120661836 | -8.1352635416 |
| 3 | 1.94000000 | -8.3596440611 | -8.0041567122 | -8.2701746385 | -7.9565959002 | -8.4524306573 | -8.1407123099 |
| 4 | 2.01000000 | -8.3206908164 | -8.0122236204 | -8.2930542623 | -8.0102676226 | -8.4174147810 | -8.0915651131 |
| 5 | 2.09000000 | -8.2343468426 | -8.0875737385 | -8.2806413748 | -8.1221351124 | -8.2779231343 | -8.1233313815 |
| 6 | 2.17000000 | -8.1106972352 | -8.2355144273 | -8.2251518430 | -8.3516461240 | -8.1187989736 | -8.2896147922 |

Figure 10

| No. | Freq(GHz) | Ang[S(3,6)] | Ang[S(3,7)] | Ang[S(3,8)] | Ang[S(3,9)] | Ang[S(3,10)] | Ang[S(3,11)] |
|---|---|---|---|---|---|---|---|
| 1 | 1.71000000 | 112.1461374121 | -7.6836890162 | -127.7794795052 | 112.3524640743 | -7.2195921581 | -126.9699092330 |
| 2 | 1.86000000 | -48.7638327047 | -169.1283303752 | 71.3681786749 | -48.5767120094 | -171.7312941191 | 67.8424846560 |
| 3 | 1.94000000 | -133.6176000656 | 106.6068767446 | -12.8417659530 | -132.8388334154 | 102.8892586591 | -16.7967308081 |
| 4 | 2.01000000 | 152.3111484293 | 32.6626509588 | -87.3484698292 | 153.2379846343 | 29.0707170915 | -90.2648662472 |
| 5 | 2.09000000 | 68.9365141571 | -52.3461287268 | -173.1172852177 | 67.6806833535 | -54.9646293443 | -174.2990967801 |
| 6 | 2.17000000 | -19.8113649894 | -139.1061811395 | 98.9146978301 | -20.5628410209 | -138.8219197763 | 101.5019635946 |

| No. | Freq(GHz) | dB[S(4,6)] | dB[S(4,7)] | dB[S(4,8)] | dB[S(4,9)] | dB[S(4,10)] | dB[S(4,11)] |
|---|---|---|---|---|---|---|---|
| 1 | 1.71000000 | -8.1765704060 | -8.0608164492 | -8.2312755533 | -8.1004715757 | -8.2483921002 | -8.1360593338 |
| 2 | 1.86000000 | -8.3639931278 | -8.6466933596 | -7.7437682879 | -8.0565055346 | -7.9383273846 | -8.2481258956 |
| 3 | 1.94000000 | -8.4253543796 | -8.7865095303 | -7.7117988890 | -8.0494208106 | -7.9641237805 | -8.3113059603 |
| 4 | 2.01000000 | -8.3682185017 | -8.7093587598 | -7.7378468118 | -8.0674094416 | -7.9822059670 | -8.3271124831 |
| 5 | 2.09000000 | -8.2597148661 | -8.4163595870 | -7.9419880335 | -8.0974597442 | -8.1321971876 | -8.2838357086 |
| 6 | 2.17000000 | -8.1802094596 | -8.0497322048 | -8.4288422788 | -8.2585674604 | -8.4152455187 | -8.2237997852 |

| No. | Freq(GHz) | Ang[S(4,6)] | Ang[S(4,7)] | Ang[S(4,8)] | Ang[S(4,9)] | Ang[S(4,10)] | Ang[S(4,11)] |
|---|---|---|---|---|---|---|---|
| 1 | 1.71000000 | 172.2162600061 | 112.2408662407 | 51.9430063116 | -7.8028959259 | -67.7914271721 | -127.5641147502 |
| 2 | 1.86000000 | 19.7851365766 | -49.0586615548 | -108.5268183570 | -166.3304008670 | 131.9850314916 | 72.1020039724 |
| 3 | 1.94000000 | -73.7735985083 | -133.8371392941 | 167.0616699843 | 107.2521327176 | 47.3535223401 | -12.4863275136 |
| 4 | 2.01000000 | -147.7312229639 | 152.5688926403 | 93.0522830440 | 33.3490913876 | -27.0521625857 | -86.8605220782 |
| 5 | 2.09000000 | 126.3132964012 | 67.5577865073 | 7.2941178326 | -52.0851138822 | -113.2086305627 | -172.5543989890 |
| 6 | 2.17000000 | 40.0999390472 | -19.1356951161 | -80.3705999358 | -139.5479883400 | 156.5801329360 | 99.2278362700 |

| No. | Freq(GHz) | dB[S(5,6)] | dB[S(5,7)] | dB[S(5,8)] | dB[S(5,9)] | dB[S(5,10)] | dB[S(5,11)] |
|---|---|---|---|---|---|---|---|
| 1 | 1.71000000 | -8.0406712966 | -8.1768256221 | -8.1140215180 | -8.2260829890 | -8.1306167140 | -8.2503957009 |
| 2 | 1.86000000 | -8.6780071226 | -8.3538285323 | -8.0523007305 | -7.7454561542 | -8.2423834364 | -7.9464223274 |
| 3 | 1.94000000 | -8.7398076755 | -8.4314191286 | -8.0474908304 | -7.7044456392 | -8.2877844854 | -7.9610491088 |
| 4 | 2.01000000 | -8.6752101687 | -8.3788875004 | -8.0425485268 | -7.7409845416 | -8.3070915500 | -7.9980029345 |
| 5 | 2.09000000 | -8.4144248969 | -8.2643475458 | -8.0956481702 | -7.9425749330 | -8.2861565677 | -8.1336658429 |
| 6 | 2.17000000 | -8.0167367763 | -8.1904023954 | -8.2594069745 | -8.4376585657 | -8.2225411166 | -8.4183953964 |

| No. | Freq(GHz) | Ang[S(5,6)] | Ang[S(5,7)] | Ang[S(5,8)] | Ang[S(5,9)] | Ang[S(5,10)] | Ang[S(5,11)] |
|---|---|---|---|---|---|---|---|
| 1 | 1.71000000 | 81.9313701929 | -157.9796947515 | -36.1991694335 | 81.7575803976 | -158.9419837124 | -37.9231229038 |
| 2 | 1.86000000 | -79.3503995102 | 40.4575325269 | 161.1756725997 | -78.7408486352 | 41.7275219411 | 161.7088632464 |
| 3 | 1.94000000 | -164.1123976876 | -43.9865965032 | 76.7486019721 | -163.0536936402 | -43.0419219962 | 77.2556750193 |
| 4 | 2.01000000 | 121.6835913475 | -117.7049119684 | 2.5064565067 | 123.0454512893 | -117.6047328363 | 2.9965367256 |
| 5 | 2.09000000 | 36.4838461084 | 157.2041612823 | -83.1371075129 | 37.5604796348 | 156.3709977561 | -82.9388115260 |
| 6 | 2.17000000 | -50.4087254909 | 70.6260126974 | -170.5903499746 | -49.9097961006 | 68.3712596665 | -170.9813023907 |

Figure 11

3×3 BUTLER MATRIX AND 5×6 BUTLER MATRIX

FIELD OF THE INVENTION

The present invention relates to the technical field of microwave passive components, and particularly to 3×3 Butler matrix and 5×6 Butler matrix used for beam forming network.

BACKGROUND OF THE INVENTION

With the fast development of mobile communication technology and rapid increase of mobile communication business, problems of strong signal interference within communication zone, insufficient spectrum capacity and signal cover are faced. Multi-wave beam antennas may simultaneously generate directional pattern performances of multi wave beams and may increase network capacity. In addition, the multi-wave beam antennas are useful to obtain narrow wave beam and high gain and may decrease signal interference and increase covering distance. Therefore, the multi-wave beam antennas have broad application prospects and great value.

Butler matrix is an important part of the multi-wave beam antennas and is a key component for generating multi-wave beam characteristic. However, the Butler in the prior art is of large size, narrow frequency band and higher loss and is to be improved.

SUMMARY OF THE INVENTION

The object of the invention is to provide 3×3 Butler matrix and 5×6 Butler matrix of small size, broad frequency band, high isolation and stable performance aiming at lacks in the prior art.

In order to achieve the above purpose, the following technical solutions are employed in the invention:

A 3×3 Butler matrix includes a first directional coupler, a second directional coupler, a third directional coupler, a first fixed phase shifter, a second fixed phase shifter and a third fixed phase shifter, wherein each directional coupler has two input ends and two output ends, respectively a first input end, a second input end, a first output end and a second output end.

the 3×3 Butler matrix has three input ports and three output ports, respectively a first input port, a second input port, a third input port, a first output port, a second output port and a third output port.

The second input end of the second directional coupler is connected to the first input port, the second input end of the first directional coupler is connected to the second input port, the first input end of the first directional coupler is connected to the third input port, the first output end of the first directional coupler is connected to the first input end of the third directional coupler via the first fixed phase shifter, the second output end of the first directional coupler is connected with the first input end of the second directional coupler, the first output end of the second directional coupler is connected with the second input end of the third directional coupler, the second output end of the second directional coupler is connected to the first output port via the third fixed phase shifter, the second output end of the third directional coupler is connected to the second output port via the second fixed phase shifter, the first output end of the third directional coupler is connected to the third output port.

The transfer phase of the first fixed phase shifter is delayed 90 degree with respect to that from the first input end to the first output end of the second directional coupler, the transfer phase of the second fixed phase shifter is delayed 90 degree with respect to that from the first output end of the third directional coupler to the third output port, and the transfer phase of the third fixed phase shifter is delayed 90 degree with respect to that from the first output end of the second directional coupler to the second output port.

Further, the first input ends and the first output ends of the first to third directional coupler are distributed at the same sides, and the second input ends and the second output ends are distributed at the same sides.

The first directional coupler and the third directional coupler are directional coupler with equal power division having 90 degree phase shift characteristic. The powers allocated to the two ends thereof are equal and respectively is half the power of the input signal.

The second directional coupler is a directional coupler with unequal power division having 90 degree phase shift characteristic. The powers allocated to the two ends thereof are respectively one third and two thirds of the power of the input signal.

When any input ends of the first, the second or the third directional coupler are fed, the transfer phase of the output end thereof at the opposite side is delayed 90 degree with respect to that of the other output end of the same side.

Further, the first to third directional couplers and the first to third fixed phase shifters are micro-strip or strip-line structure.

Further, the first to third directional couplers are branch-line couplers or coupled-line couplers.

Further, the structures of the first to third fixed phase shifters include two $\lambda/4$ transmission lines connected in series and of the same impedance and a $\lambda/4$ short-circuit transmission line or $\lambda/2$ open-circuit transmission line connected at the middle point of these two transmission lines, and $\lambda$ is center frequency of working frequency of the fixed phase shifter.

A 5×6 Butler matrix includes a first 3×3 Butler matrix, a second 3×3 Butler matrix, a fourth directional coupler, a fifth directional coupler, a power divider, a fourth fixed phase shifter and a fifth fixed phase shifter, wherein each directional coupler has two input ends and two output ends, respectively a first input end, a second input end, a first output end and the second output end, the power divider has an input end, a first output end and a second output end.

The 5×6 Butler matrix has five input ports and six output ports, respectively the first to fifth input ports and the first to sixth output ports.

The input end of the power divider is connected to the first input port of the 5×6 Butler matrix, the second output end of the power divider is connected to the first input end of the second 3×3 Butler matrix, the first output end of the power divider is connected to the first input end of the first 3×3 Butler matrix, the second input end of the fifth directional coupler is connected to the second input port of the 5×6 Butler matrix, the first input end is connected to the third input port of the 5×6 Butler matrix, the second output end is connected to the second input end of the second 3×3 Butler matrix, the first output end is connected to the second input end of the first 3×3 Butler matrix via the fifth fixed phase shifter, the second input end of the fourth directional coupler is connected to the fourth input port of the 5×6 Butler matrix, the first input end is connected to the fifth input port of the 5×6 Butler matrix, the second output end is connected to the third input end of the second 3×3 Butler matrix, the first output end is connected to the third input end of the first 3×3 Butler matrix via the fourth fixed phase shifter, the first output end, the second output end and the third output end of the second 3×3 Butler matrix are respectively connected to the first output port, the fifth output port and the third output port of the 5×6 Butler matrix, the first output end, the second output end and the third output end of the first 3×3 Butler matrix are respectively connected to the second output port, the sixth output port and the fourth output port of the 5×6 Butler matrix.

The fourth fixed phase shifter is a 30° advanced phase shifter, and the fifth fixed phase shifter is a 150° advanced phase shifter.

Further, the first input ends and the first output ends of the fourth directional coupler and the fifth directional coupler are distributed at same sides, and the second input ends and the second output ends are distributed at the same sides.

The fourth directional coupler and the fifth directional coupler are both directional couplers with equal power division having 90 degree phase shift characteristic, the powers allocated to the two output ends thereof are equal and respectively is half the power of the input signal.

When any input end of the fourth or fifth directional coupler is fed, the transfer phase of the output end thereof at the opposite side is delayed 90 degree with respect to that of the other output end of the same side.

Further, the fourth directional coupler and the fifth directional coupler are branch-line couplers or coupled-line couplers.

Further, the power divider is an equipower and equiphase power divider.

Three antenna arrays may be connected to the output ports of the 3×3 Butler matrix provided by the present invention for generating three beams of different orientation at the three input ports. Five antenna arrays may be connected to the output ports of the 5×6 Butler matrix provided by the present invention for generating five beams of different orientation at the five input ports. The 3×3 Butler matrix and the 5×6 Butler matrix provided in the present invention have the features of small size, wide frequency band, low loss, high isolation and stable performance, fill the blank of specific technical schemes about the 3×3 Butler matrix and the 5×6 Butler matrix in the prior art, and have broad application prospects and great value.

BRIEF DESCRIPTION OF THE DRAWINGS

FIG. 5 is a parameter list of the simulation result of FIG. 4;

FIGS. 10 and 11 are parameter lists of the simulation result of FIG. 9.

DETAILED DESCRIPTION OF THE INVENTION

Technical solutions of the present invention will be illustrated in detail in conjunction with accompanying drawings and embodiments.

Embodiment One

Figure 1:
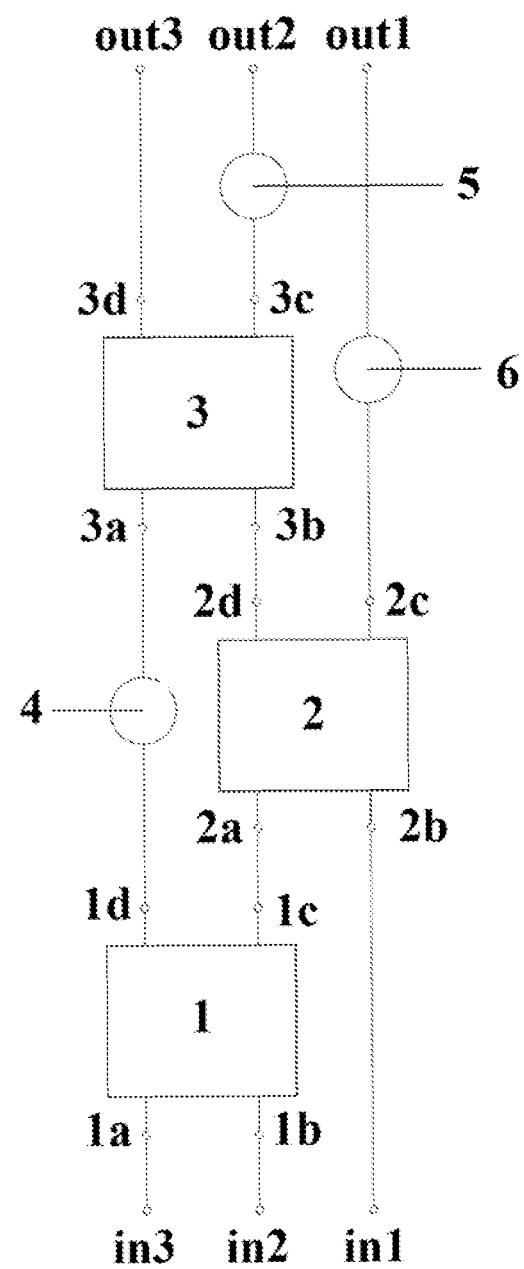
FIG. 1 is a topology view of Embodiment One of the invention.
Figure 2:
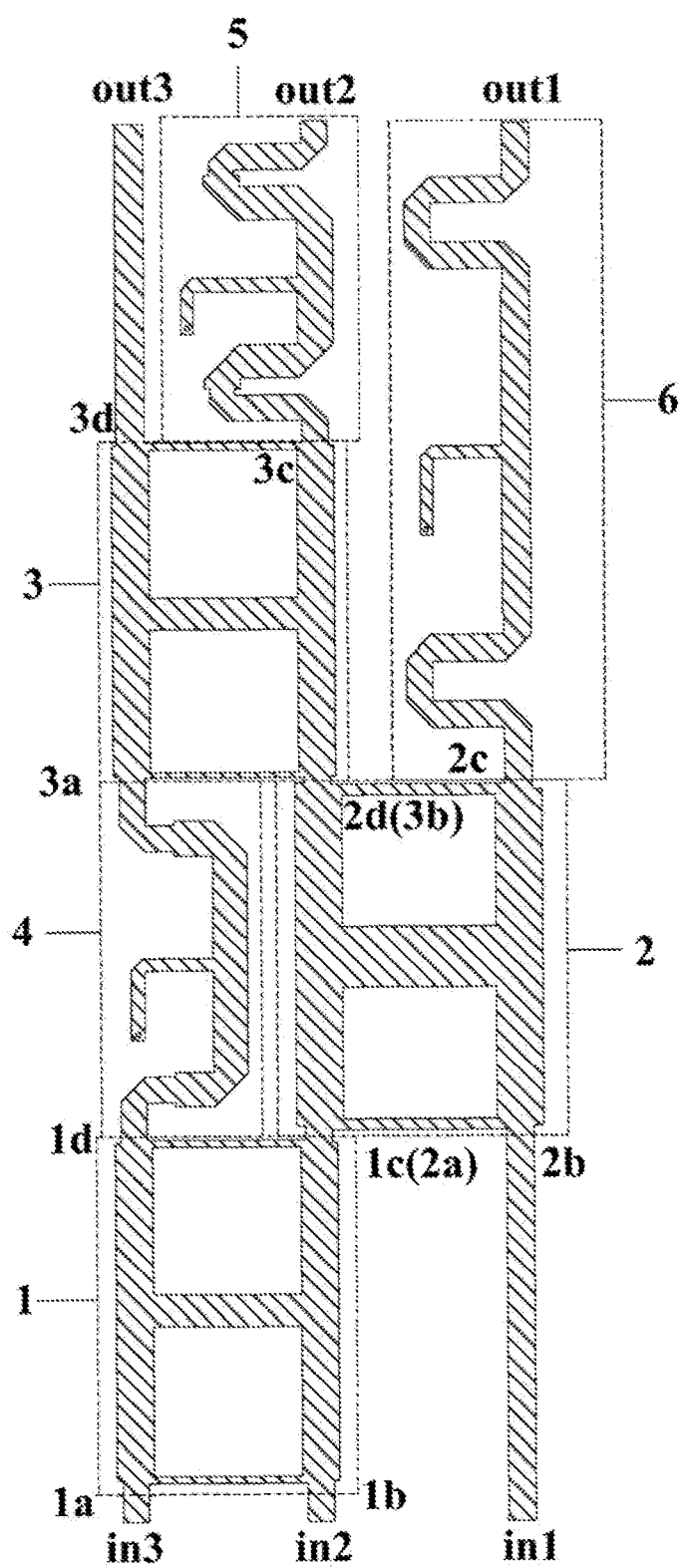
FIG. 2 is a schematic view of a micro-strip structure of Embodiment One of the invention.

Reference is made to FIGS. 1 and 2. A 3×3 Butler matrix provided by an embodiment of the invention comprises a first directional coupler 1, a second directional coupler 2, a third directional coupler 3, a first fixed phase shifter 4, a second fixed phase shifter 5 and a third fixed phase shifter 6. Each directional coupler has two input ends and two output ends, respectively a first input end, a second input end, a first output end and a second output end. The 3×3 Butler matrix has three signal input ports, respectively a first input port in1, a second input port in2 and a third input port in3, and has three output ports, respectively a first output port out1, a second output port out2 and a third output port out3.

The connecting relationship of respective components in the embodiment of the invention is shown in FIG. 1. The second input end 2b of the second directional coupler 2 is connected to the first input port in1. The second input end 1b of the first directional coupler 1 is connected to the second input port in2. The first input end 1a of the first directional coupler 1 is connected to the third input port in3. The first output end 1d of the first directional coupler 1 is connected to the first input end 3a of the third directional coupler 3 via the first fixed phase shifter 4. The second output end 1c of the first directional coupler 1 is connected with the first input end 2a of the second directional coupler 2. The first output end 2d of the second directional coupler 2 is connected with the second input end 3b of the third directional coupler 3. The second output end 2c of the second directional coupler 2 is connected to the first output port out1 via the third fixed phase shifter 6. The second output end 3c of the third directional coupler 3 is connected to the second output port out2 via the second fixed phase shifter 5. The first output end 3d of the third directional coupler 3 is connected to the third output port out3.

The first to third directional couplers and the first to third fixed phase shifters each may be implemented by employing a micro-strip or strip-line structure. In the embodiment of the invention, the first to third directional couplers and the first to third fixed phase shifters each is implemented by employing a micro-strip structure.

The first to third directional couplers are branch-line couplers or coupled-line couplers. Referring to FIG. 2, in the embodiment of the invention, the first to third directional couplers are all implemented by second order branch line coupler structure. The first input ends and the first output ends of the first to third directional couplers are distributed at the same sides and the second input ends and the second output ends are distributed at the same sides. The first to third directional couplers have 90 degree phase shift characteristics, that is, when any input ends of the first, the second or the third directional coupler are fed, the transfer phase of the output end thereof at the opposite side is delayed by 90 degree with respect to that of the other output end of the same side.

Particularly, the first directional coupler 1 is a directional coupler with equal power division having 90 degree phase shift characteristic. When a signal is fed from the first input end 1*a* of the first directional coupler 1, the power allocated to the first output end 1*d* is equal to the power allocated to the second output end 1*c*, i.e. half the power of the input signal, and the output phase of the second output end 1*c* is delayed 90 degree with respect to that of the first output end 1*d*. Similarly, When a signal is fed from the second input end 1*b* of the first directional coupler 1, the power allocated to the first output end 1*d* is equal to the power allocated to the second output end 1*c*, i.e. half the power of the input signal, and the output phase of the first output end 1*d* is delayed 90 degree with respect to that of the second output end 1*c*.

The second directional coupler 2 is a directional coupler with unequal power division having 90 degree phase shift characteristic. When a signal is fed from the first input end 2*a* of the second directional coupler 2, the power allocated to the first output end 2*d* is half the power allocated to the second output end 2*c*, i.e., the power allocated to the first output end 2*d* is one third of the power of the input signal, the power allocated to the second output end 2*c* is two thirds of the power of the input signal and the output phase of the second output end 2*c* is delayed 90 degree with respect to that of the first output end 2*d*. Similarly, When a signal is fed from the second input end 2*b* of the second directional coupler 2, the power allocated to the second output end 2*c* is half the power allocated to the first output end 2*d*, i.e., the power allocated to the second output end 2*c* is one third of the power of the input signal, the power allocated to the first output end 2*d* is two thirds of the power of the input signal and the output phase of the first output end 2*d* is delayed 90 degree with respect to that of the second output end 2*c*.

The third directional coupler 3 is a directional coupler with equal power division having 90 degree phase shift characteristic. When a signal is fed from the first input end 3*a* of the third directional coupler 3, the power allocated to the first output end 3*d* is equal to the power allocated to the second output end 3*c*, i.e. half the power of the input signal, and the output phase of the second output end 3*c* is delayed 90 degree with respect to that of the first output end 3*d*. Similarly, When a signal is fed from the second input end 3*b* of the third directional coupler 3, the power allocated to the first output end 3*d* is equal to the power allocated to the second output end 3*c*, i.e. half the power of the input signal, and the output phase of the first output end 3*d* is delayed 90 degree with respect to that of the second output end 3*c*.

Further, the first fixed phase shifter 4 is located between the first output end 1*d* of the first directional coupler 1 and the first input end 3*a* of the third directional coupler 3, and the transfer phase of the first fixed phase shifter 4 is delayed 90 degree with respect to that from the first input end 2*a* of the second directional coupler 2 to the first output end 2*d*. The second fixed phase shifter 5 is located between the second output end 3*c* of the third directional coupler 3 and the second output port out2, and is a 90 degree-delay phase shifter, that is, the transfer phase of the second fixed phase shifter 5 is delayed 90 degree with respect to that from the first output end 3*d* of the third directional coupler 3 to the third output port out3. The third fixed phase shifter 6 is located between the second output end 2*c* of the second directional coupler 2 and the first output port out1 and the transfer phase of the third fixed phase shifter 6 is delayed 90 degree with respect to that from the first output end 2*d* of the second directional coupler 2 to the second output port out2.

In the embodiment of the invention, in order that wideband property of phase shifter is obtained, the first to third fixed phase shifters are of short circuit load stub structures of quarter-wave. The structures of the first to third fixed phase shifters include two λ/4 transmission lines interconnected in series and of the same impedance and a λ/4 short-circuited transmission line connected at the middle point of these two transmission lines in parallel with them.

Figure 3:
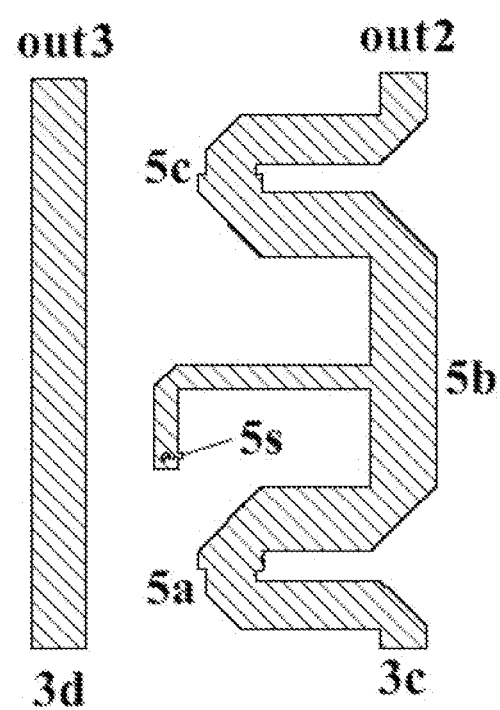
FIG. 3 is a structural schematic view of a second fixed phase shifter in Embodiment One of the invention.

Since the structures of the first to third fixed phase shifters are similar and principles of them are same, the second fixed phase shifter 5 is herein just taken as an example. Referring to FIG. 3, the structure and principle of the second fixed phase shifter 5 are analyzed. The second fixed phase shifter 5 is composed of five transmission lines including 3*c*-5*a*, 5*a*-5*b*, 5*b*-5*c*,5*c*-out2 transmission lines sequentially connected and 5*b*-5*s* transmission line connected to the middle point of 3*c*-out2, wherein 3*c*-5*a* and 5*c*-out2 transmission lines are 50 ohm transmission lines, 5*a*-5*b* and 5*b*-5*c* transmission lines are of the same line width (impedance) and the same electrical length, both are λ/4 (λ is center frequency of working frequency of the fixed phase shifter), and 5*b*-5*s* is λ/4 short-circuited transmission line parallel connected and the terminal thereof is short circuited with floor (not shown) via a conductive hole 5*s*. Firstly, the transfer phase of 3*c*-out2 transmission line in the center frequency is delayed 90° with respect to that of 3*d*-out3 transmission line by adjusting line length of 3*c*-5*a* or 5*c*-out2, and then the delay value of the transfer phase of 3*c*-out2 in the center frequency with respect to that of 3*d*-out3 is adjusted by adjusting the width (impedance) of 5*a*-5*c* and 5*b*-5*s* transmission lines. The transfer phase of 3*c*-out2 transmission line within the whole working frequency is delayed 90° with respect to that of 3*d*-out3 transmission line with the error within ±2° by selecting suitable line width (impedance), thus realizing broadband design of phase shifter.

The working principle of the embodiment of the invention is as follows:

If radio-frequency signal is input from the first input port in1, the signal is firstly passed through the second directional coupler 2 and then is divided into two outputs after being passed the second direction coupler 2. The signal of the first output end 2*d* of the second directional coupler 2 is $\frac{2}{3}\angle -90°$, and the signal of the second output end 2*c* is $\frac{1}{3}\angle 0°$, wherein the signal $\frac{2}{3}\angle -90°$ is passed to the third directional coupler 3, and the signal $\frac{1}{3}\angle 0°$ is passed to the third fixed phase shifter 6. After the signal $\frac{2}{3}\angle -90°$ is passed through the third directional coupler 3, the signals of the first output end 3*d* and the second output end 3*c* of the third directional coupler 3 are respectively $\frac{1}{3}\angle -180°$ and $\frac{1}{3}\angle -90°$ and the output signal of the third output port out3 is $\frac{1}{3}\angle -180°$. After the signal $\frac{1}{3}\angle -90°$ is passed through the second fixed phase shifter 5, the output signal of the second output port out2 is $\frac{1}{3}\angle -180°$. After the signal $\frac{1}{3}\angle 0°$ of the second output end 2*c* of the second directional coupler 2 is passed through the third fixed phase shifter 6, the output signal of the first output port out1 is $\frac{1}{3}\angle -180°$. Therefore, if the signal is input from the first input port in1, the signals of the first output port out1, the second output port out2 and the third output port out3 are respectively $\frac{1}{3}\angle -180°$, $\frac{1}{3}\angle -180°$ and $\frac{1}{3}\angle -180°$, that is, when the first input port in1 is fed, the amplitudes and phases of the signals of the first to third output ports are equal.

If radio-frequency signal is input from the second input port in2, the signal is firstly passed through the first directional coupler 1 and then is divided into two outputs after being passed the first direction coupler 1. The signal of the first output end 1*d* of the first directional coupler 1 is $\frac{1}{2}\angle -90°$, and the signal of the second output end 1*c* is $\frac{1}{2}\angle 0°$, wherein the signal $\frac{1}{2}\angle 0°$ is passed to the second directional coupler 2, and the signal $\frac{1}{2}\angle-90°$ is passed to the first fixed phase shifter 4. After the signal $\frac{1}{2}\angle 0°$ is passed through the second directional coupler 2, the signals of the first output end 2d and the second output end 2c of the second directional coupler 2 are respectively $\frac{1}{6}\angle 0°$ and $\frac{1}{3}\angle-90°$, wherein the signal $\frac{1}{6}\angle 0°$ is passed to the third directional coupler 3, and the signal $\frac{1}{3}\angle-90°$ is passed to the third fixed phase shifter 6. After the signal $\frac{1}{6}\angle 0°$ is passed through the third directional coupler 3, the signal of the first output end 3d and the second output end 3c are respectively $\frac{1}{12}\angle-90°$ and $\frac{1}{12}\angle 0°$. After the signal $\frac{1}{12}\angle 0°$ is again passed to the second fixed phase shifter 5, the signal of the second output port out2 is $\frac{1}{12}\angle-90°$. After the signal $\frac{1}{3}\angle-90°$ is passed to the third fixed phase shifter 6, the signal of the first output port out1 is $\frac{1}{3}\angle-270°$. After the signal $\frac{1}{2}\angle-90°$ of the first output end 1d of the first directional coupler 1 is passed through the first fixed phase shifter 4, the signal of the first input end 3a of the third directional coupler 3 is $\frac{1}{2}\angle-180°$. After the signal $\frac{1}{2}\angle-180°$ is passed through the third directional coupler 3, the first output end 3d and the second output end 3c of the third directional coupler 3 are respectively $\frac{1}{4}\angle-180°$ and $\frac{1}{4}\angle-270°$. After $\frac{1}{4}\angle-270°$ is passed through the second fixed phase shifter 5, the signal of the second output port out2 is $\frac{1}{4}\angle-360°$. The signal from the second input port in2 to the second output port out2 is a superposition of vectors of the signal $\frac{1}{2}\angle-90°$ and the signal $\frac{1}{4}\angle-360°$ and is $\frac{1}{3}\angle-30°$. The signal from the second input port in2 to the third output port out3 is a superposition of vectors of the signal $\frac{1}{2}\angle-90°$ and the signal $\frac{1}{4}\angle-180°$ and is $\frac{1}{3}\angle-150°$. Therefore, if the signal is input from the second input port in2, the signals of the first output port out1, the second output port out2 and the third output out3 are respectively $\frac{1}{3}\angle-270°$, $\frac{1}{3}\angle-30°$ and $\frac{1}{3}\angle-150°$, that is, when the second input port in2 is fed, the amplitudes and phases of the signals of the first to third output ports are equal and the difference of phases of powers allocated to the adjacent output ports is $-120°$.

If radio-frequency signal is input from the third input port in3, the signal is firstly passed through the first directional coupler 1 and then is divided into two outputs after being passed the first direction coupler 1. The signal of the first output end 1d is $\frac{1}{2}\angle 0°$, and the signal of the second output end 1c is $\frac{1}{2}\angle-90°$, wherein the signal $\frac{1}{2}\angle-90°$ is passed to the second directional coupler 2 and the signal $\frac{1}{2}\angle 0°$ is passed to the first fixed phase shifter 4. After the signal $\frac{1}{2}\angle-90°$ is passed through the second directional coupler 2, the signals of the first output end 2d and the second output end 2c of the second directional coupler 2 are respectively $\frac{1}{6}\angle-90°$ and $\frac{1}{3}\angle-180°$, wherein the signal $\frac{1}{6}\angle-90°$ is passed to the third directional coupler 3, and the signal $\frac{1}{3}\angle-180°$ is passed to the third fixed phase shifter 6. After the signal $\frac{1}{6}\angle-90°$ is passed through the third directional coupler 3, the first output end 3d and the second output end 3c of the third directional coupler 3 are respectively $\frac{1}{2}\angle-180°$, $\frac{1}{2}\angle-90°$. After the signal $\frac{1}{2}\angle-90°$ is again passed to the second fixed phase shifter 5, the signal of the second output port out2 is $\frac{1}{12}\angle-180°$. After the signal $\frac{1}{3}\angle-180°$ is passed through the third fixed phase shifter 6, the signal of the first output port out1 is $\frac{1}{3}\angle-360°$. After the signal $\frac{1}{2}\angle 0°$ is passed through the first fixed phase shifter 4, the signal of the first input end 3a of the third directional coupler 3 is $\frac{1}{2}\angle-90°$. After the signal $\frac{1}{2}\angle-90°$ is passed through the third directional coupler 3, the signals of the first output end 3d, the second output end 3c of the third directional coupler 3 are respectively $\frac{1}{4}\angle-90°$ and $\frac{1}{4}\angle-180°$. After $\frac{1}{4}\angle-180°$ is passed through the second fixed phase shifter 5, the signal of the second output port out2 is $\frac{1}{4}\angle-270°$. The signal from the third input port in3 to the second output port out 2 is a superposition of vectors of the signal $\frac{1}{2}\angle-180°$ and the signal $\frac{1}{4}\angle-270°$ and is $\frac{1}{3}\angle-240°$. The signal from the third input port in3 to the third output port out3 is a superposition of vectors of the signal $\frac{1}{12}\angle-180°$ and the signal $\frac{1}{4}\angle-90°$ and is $\frac{1}{3}\angle-120°$. Therefore, if the signal is input from the third input port in3, the signals of the first output port out1, the second output port out2 and the third output out3 are respectively $\frac{1}{3}\angle-360°$, $\frac{1}{3}\angle-240°$ and $\frac{1}{3}\angle-120°$, that is, when the third input port in3 is fed, the amplitudes of the signals of the first to third output ports are equal and the difference of phases of powers allocated to the adjacent output ports is $+120°$.

Figure 4:
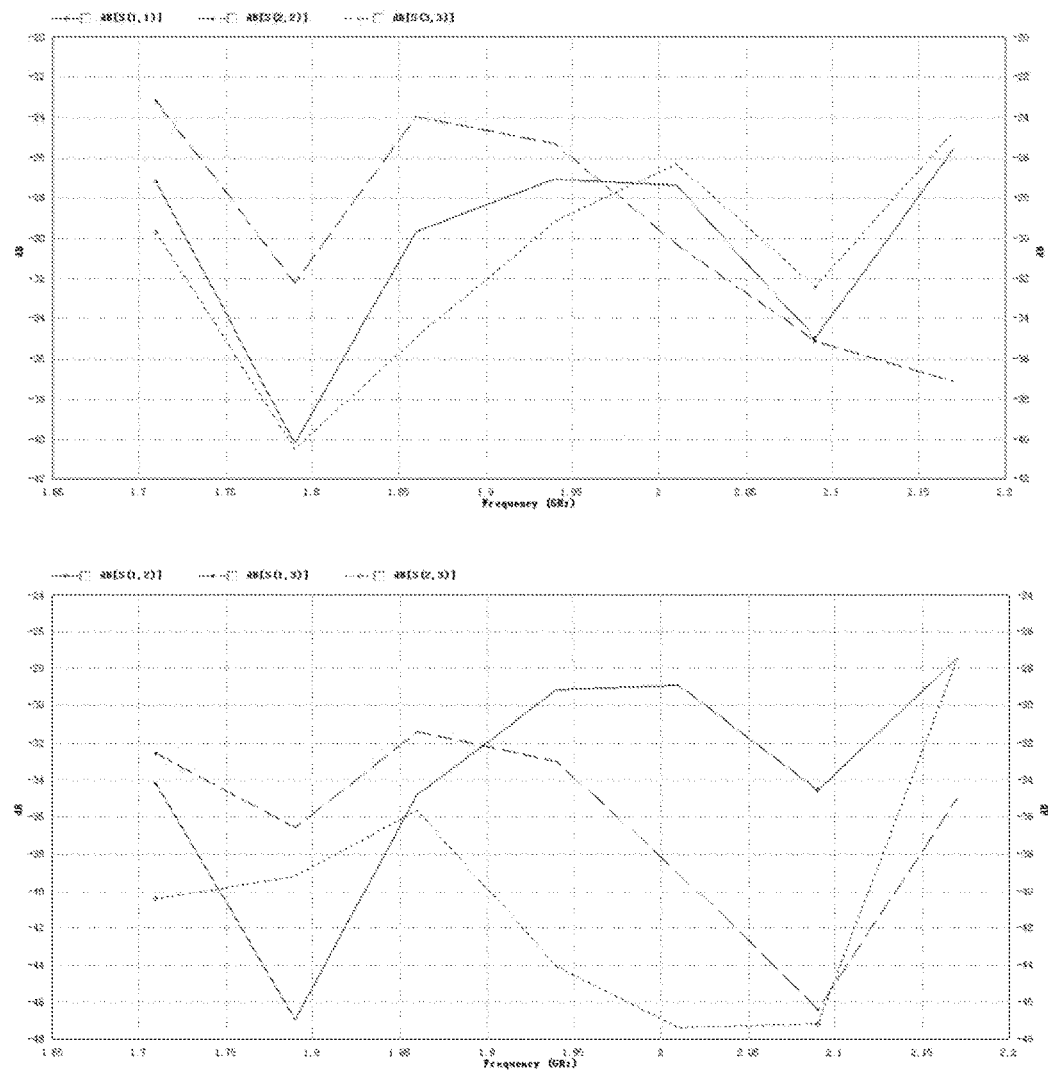
FIG. 4 is a simulation result chart of S parameter of Embodiment One of the invention.

FIGS. 4 and 5 are IE3D simulation results of the embodiment of the invention. The ports 1, 2 and 3 are respectively corresponding to the first input port in1, the second input port in2 and the third input port in3, and the ports 4, 5 and 6 are respectively corresponding to the first output port out1, the second output port out2 and the third output port out3. As seen from figures, the return losses of the three beam ports, the first input port in1, the second input port in2 and the third input port in3 are below $-23$ dB within broadband band 1710-217 MHz and the isolations between the first to third input ports are above 26 dB within the working frequency. When the signal is input from the first input port in1, the difference of phases of the adjacent output ports of the first to third output ports within the working frequency is within the range of $0°\pm1°$, the amplitudes are all within the range of $-5.0\pm0.4$ dB and the losses are below 0.3 dB. When the signal is input from the second input port in2, the difference of phases of the adjacent output ports of the first to third output ports within the working frequency is within the range of $-120°\pm4°$, the amplitudes are all within the range of $-5.01\pm0.2$ dB and the losses are below 0.3 dB. When the signal is input from the third input port in3, the difference of phases of the adjacent output ports of the first to third output ports within the working frequency is within the range of $120°\pm2°$, the amplitudes are all within the range of $-5.05\pm0.4$ dB and the losses are below 0.3 dB.

Three antenna arrays may be connected to the output ports of the 3×3 Butler matrix provided by the embodiment of the invention for generating three beams of different orientation at the three input ports.

Embodiment Two

Figure 6:
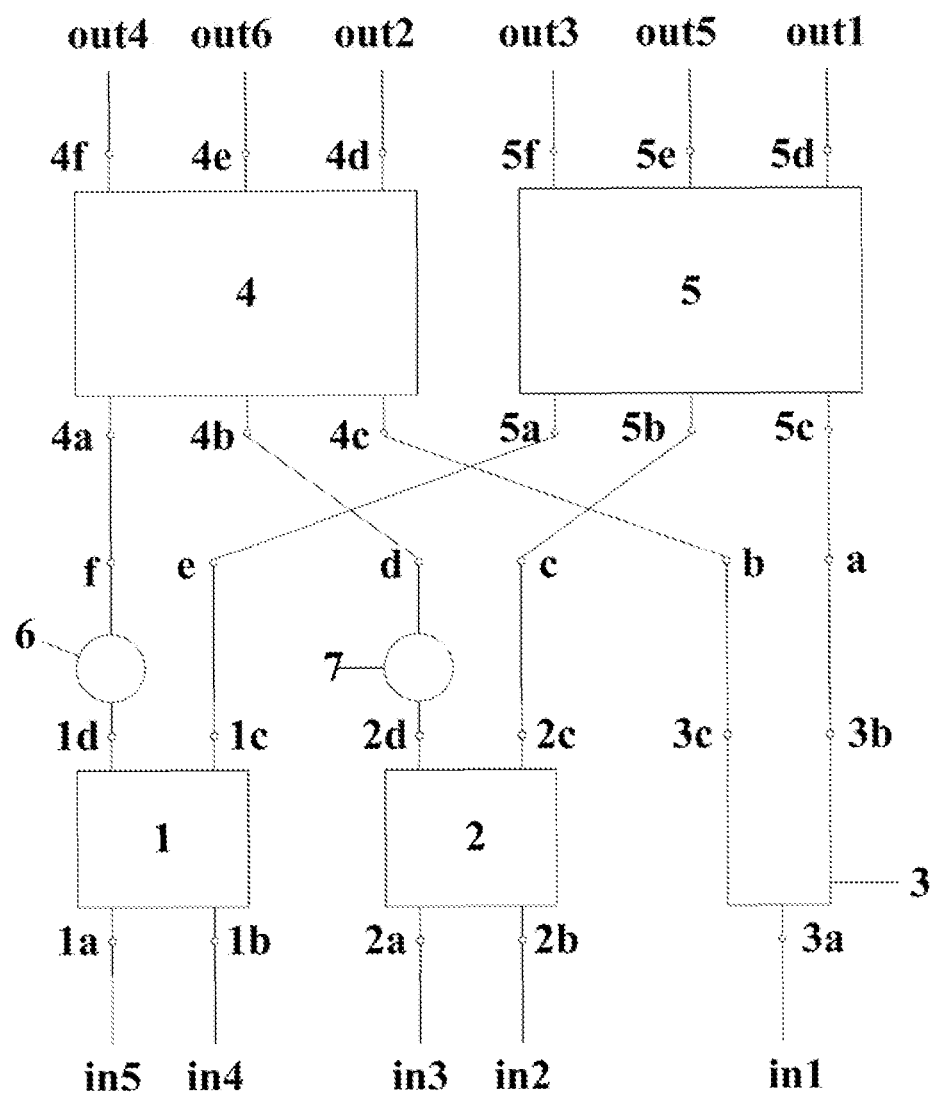
FIG. 6 is a topology view of Embodiment Two of the invention.
Figure 7:
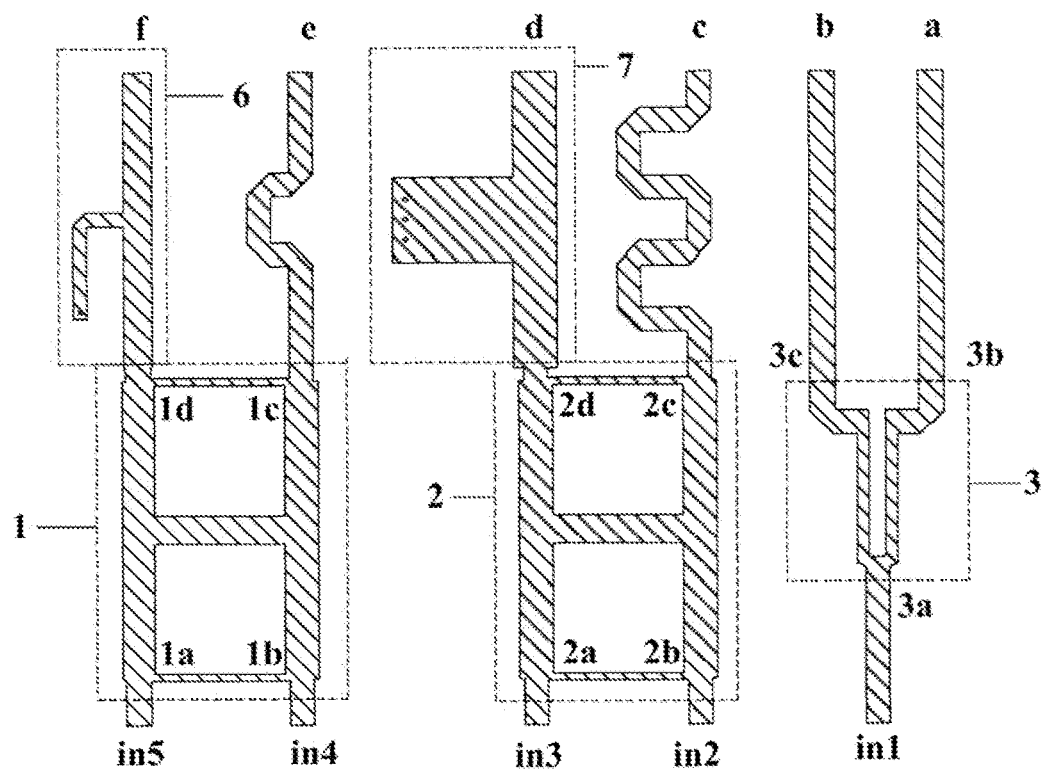
FIG. 7 is a schematic view of a part of micro-strip structure of Embodiment Two of the invention.

Referring to FIGS. 6 and 7, a 5×6 Butler matrix provided by the embodiment of the invention is composed of a fourth directional coupler 1, a fifth directional coupler 2, a power divider 3, a first 3×3 Butler matrix 4, a second 3×3 Butler matrix 5, a fourth fixed phase shifter 6 and a fifth fixed phase shifter 7. Each directional coupler has two input ends and two output ends, respectively a first input end, a second input end, a first output end and the second output end. The 5×6 Butler matrix has five signal input ports, respectively a first input port in1, a second input port in2, a third input port in3, a fourth input port in4 and a fifth input port in5, and has six output ports, respectively a first output port out1, a second output port out2, a third output port out3, a fourth output port out4, a fifth output port out5 and a sixth output port out6. The power divider 3 has an input end 3a, a first output end 3c and a second output end 3b.

The connecting relationship of respective components in the embodiment of the invention is shown in FIG. 6. The input end 3a of the power divider 3 is connected to the first input port in1 of the 5×6 Butler matrix. The second output end 3b of the power divider 3 is connected to the first input end 5c of the second 3×3 Butler matrix 5, and the first output end 3c of the power divider 3 is connected to the first input end 4c of the first 3×3 Butler matrix 4. The second input end 2b of the fifth directional coupler 2 is connected to the second input port in2 of the 5×6 Butler matrix, the first input end 2a is connected to the third input port in3 of the 5×6 Butler matrix, the second output end 2c is connected to the second input end 5b of the second 3×3 Butler matrix and the first output end 2d is connected to the second input end 4b of the first 3×3 Butler matrix via the fifth fixed phase shifter 7. The second input end 1b of the fourth directional coupler 1 is connected to the fourth input port in4 of the 5×6 Butler matrix, the first input end 1a is connected to the fifth input port in5 of the 5×6 Butler matrix, the second output end 1c is connected to the third input end 5a of the second 3×3 Butler matrix, and the first output end 1d is connected to the third input end 4a of the first 3×3 Butler matrix via the fourth fixed phase shifter 6. The first output end 5d, the second output end 5e and the third output end 5f of the second 3×3 Butler matrix 5 are respectively connected to the first output port out1, the fifth output port out5 and the third output port out3 of the 5×6 Butler matrix. The first output end 4d, the second output end 4e and the third output end 4f are respectively connected to the second output port out2, the sixth output port out6 and the fourth output port out4 of the 5×6 Butler matrix.

Particularly, the fourth directional coupler 1 and the fifth directional coupler 2 are both directional couplers with equal power division having 90 degree phase shift characteristic. The working principles thereof are the same as that of the first directional coupler and the third directional coupler in Embodiment One, and thus will not be described.

Since the 3×3 Butler matrix provided by Embodiment One is employed in the embodiment of the invention, to avoid that the schematic view is too complicated, the first 3×3 Butler matrix 4 and the second 3×3 Butler matrix 5 are omitted in FIG. 7 and only the structure below the nodes a, b, c, d, e and f is shown in FIG. 6. Particularly, in the embodiment of the invention, the fourth directional coupler 1 and the fifth directional coupler 2 are both implemented by employing branch-line couplers of broad frequency. As the same with the structures of the first to third directional coupler in Embodiment One, the structures of the fourth directional coupler 1 and the fifth directional coupler 2 also have a shape of "日", wherein the two nodes at the left bottom and at the right bottom are respectively the first input end and the second input end, and the two nodes at the left top and at the right top are respectively the first output end and the second output end.

The power divider 3 is an equipower and equiphase power divider. That is, when the signal is fed from the input end 3a of the power divider 3, the phases of the signals of the first output end 3c and the second output end 3b of the power divider 3 are equal and the amplitudes are same. In the embodiment of the invention, the power divider 3 is implemented by employing 3 dB Wilkinson power divider structure.

Further, the fourth fixed phase shifter 6 is a 30° advanced phase shifter located between the first output end 1d of the fourth directional coupler 1 and the third input end 4a of the first 3×3 Butler matrix 4. The fifth fixed phase shifter 7 is a 150° advanced phase shifter located between the first output end 2d of the fifth directional coupler 2 and the second input end 4b of the first 3×3 Butler matrix 4.

Figure 8:
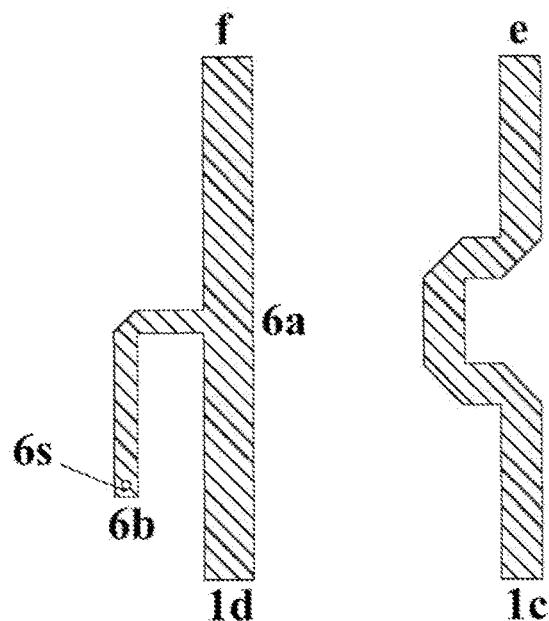
FIG. 8 is a structural schematic view of a fourth fixed phase shifter in FIG. 7.

In the embodiment of the invention, since the structures of the fourth fixed phase shifter and the fifth fixed phase shifter are similar and principles of them are same, the fourth fixed phase shifter 6 is herein just taken as an example. Referring to FIG. 8, the structure and principle of the fourth fixed phase shifter 6 are analyzed. The fourth fixed phase shifter 6 is composed of three transmission lines, respectively 1d-6a, 6a-f and 6a-6b transmission lines, wherein 1d-6a and 6a-f transmission lines are of the same line width (impedance) and of the same electrical length, both are λ/4 (λ is center frequency of working frequency of the fixed phase shifter), and 6a-6b is a λ/4 short-circuited transmission line parallel connected and the terminal thereof is short circuited with floor (not shown) via a conductive hole 6s. Firstly, the transfer phase of 1d-f transmission line in the center frequency is advanced 30° with respect to that of 1c-e transmission line by adjusting line length of 1c-e, and then the advance value of the transfer phase of 1d-f in the center frequency with respect to that of 1c-e is changed by adjusting the width (impedance) of 1d-f and 6b-6b transmission lines. The transfer phase of 1d-f transmission line within the whole working frequency is advanced 30° with respect to that of 1c-e transmission line with the error within ±1° by selecting suitable line width (impedance) of 1d-f and 6a-6b transmission lines.

The particular structures of the first 3×3 Butler matrix 4 and the second 3×3 Butler matrix 5 are the same as the structure provided by Embodiment One and thus will not be described.

Further, in the embodiment of the invention, the nodes a, b, c, d, e and f are connected with the first to third input ports of the first 3×3 Butler matrix 4 and the first to third input ports of the second 3×3 Butler matrix 5 by using 50 ohm cables (not shown) of the same length.

The working principle of the embodiment of invention is as follows:

If radio-frequency signal is input from the first input port in1, the signal is firstly passed through the power divider 3 and then is divided into two outputs after being passed the power divider 3. The signal of the first output end 3c of the power divider 3 is ½∠0°. The ½∠0° is passed to the first 3×3 Butler matrix 4. After the ½∠0° is passed through the first 3×3 Butler matrix 4, the signals of the second output port out2, the fourth output port out4 and the sixth output port out 6 of the 5×6 Butler matrix are respectively ⅙∠0°, ⅙∠0°, ⅙∠0°. The signal of the second output end 3b of the power divider 3 is ½∠0°. The ½∠0° is passed to the second 3×3 Butler matrix 5. After the ½∠0° is passed through the second 3×3 Butler matrix 5, the signals of the first output port out1, the third output port out3 and the fifth output port out5 of the 5×6 Butler matrix are respectively ⅙∠0°, ⅙∠0°, ⅙∠0°. Therefore, if the signal is input from the first input port in1, the signals of the first to sixth output ports are respectively ⅙∠0°, ⅙∠0°, ⅙∠0°, ⅙∠0°, ⅙∠0°, ⅙∠0°. The amplitudes of the powers allocated to the adjacent output ports are the same, is ⅙, and the difference of phases of the powers allocated to the adjacent output ports is 0°.

If radio-frequency signal is input from the second input port in2, the signal is firstly passed through the fifth directional coupler 2 and the fifth fixed phase shifter 7 and then is divided into two outputs after being passed through the fifth directional coupler 2 and the fifth fixed phase shifter 7. The signal of the first output end 2d of the fifth directional coupler 2 is ½∠−90°. After the signal ½∠−90° is passed through the fifth fixed phase shifter 7, the signal is ∠+60°. The signal ∠+60° is passed to the first 3×3 Butler matrix 4. After the signal ∠+60° is passed through the first 3×3 Butler matrix 4, the signals of the second output port out2, the sixth output port out6 and the fourth output port out4 of the 5×6 Butler matrix are respectively ⅙∠+60°, ⅙∠−60°, ⅙∠−

180°. The signal of the second output end 2c of the fifth directional coupler 2 is ½∠0°. The signal ½∠0° is passed to the second 3×3 Butler matrix 5. After the signal ½∠0° is passed through the second 3×3 Butler matrix 5, the signals of the first output port out1, the fifth output out5 and the third output port out3 of the 5×6 Butler matrix are respectively ⅙∠0°, ⅙∠−120°, ⅙∠−240°. Therefore, if the signal is input from the second input port in2, the signals of the first to sixth input ports are respectively ⅙∠0°, ⅙∠+60°, ⅙∠−240°, ⅙∠−180°, ⅙∠−120°, ⅙∠−60°. The amplitudes of the powers allocated to the adjacent output ports are the same, is ⅙, and the difference of phases of the powers allocated to the adjacent output ports is +60°.

If radio-frequency signal is input from the third input port in3, the signal is firstly passed through the fifth directional coupler 2 and the fifth fixed phase shifter 7 and then is divided into two outputs after being passed through the fifth directional coupler 2 and the fifth fixed phase shifter 7. The signal of the first output end 2d of the fifth directional coupler 2 is ½∠0°. After the signal ½∠0° is passed through the fifth fixed phase shifter 7, the signal is ∠+150°. The signal ∠+150° is passed to the first 3×3 Butler matrix 4. After the signal ∠+150° is passed through the first 3×3 Butler matrix 4, the signals of the second output port out2, the sixth output port out6 and the fourth output port out4 of the 5×6 Butler matrix are respectively ⅙∠+150°, ⅙∠+30°, ⅙∠−90°. The signal of the second output end 2c of the fifth directional coupler 2 is ½∠−90°. The signal ½∠−90° is passed to the second 3×3 Butler matrix 5. After the signal ½∠−90° is passed through the second 3×3 Butler matrix 5, the signals of the first output port out1, the fifth output out5 and the third output port out3 of the 5×6 Butler matrix are respectively ⅙∠−90°, ⅙∠−210°, ⅙∠−330°. Therefore, if the signal is input from the third input port in3, the signals of the first to sixth input ports are respectively ⅙∠−90°, ⅙∠+150°, ⅙∠−330°, ⅙∠−90°, ⅙∠−210°, ⅙∠+30°. The amplitudes of the powers allocated to the adjacent output ports are the same, is ⅙, and the difference of phases of the powers allocated to the adjacent output ports is −120°.

If radio-frequency signal is input from the fourth input port in4, the signal is firstly passed through the fourth directional coupler 1 and the fourth fixed phase shifter 6 and then is divided into two outputs after being passed through the fourth directional coupler 1 and the fourth fixed phase shifter 6. The signal of the first output end 1d of the fourth directional coupler 1 is ½∠−90°. After the signal ½∠−90° is passed through the fourth fixed phase shifter 6, the signal is ∠−60°. The signal ∠−60° is passed to the first 3×3 Butler matrix 4. After the signal ∠−60° is passed through the first 3×3 Butler matrix 4, the signals of the second output port out2, the sixth output port out6 and the fourth output port out4 of the 5×6 Butler matrix are respectively ⅙∠−60°, ⅙∠+60°, ⅙∠+180°. The signal of the second output end 1c of the fourth directional coupler 1 is ½∠0°. The signal ½∠0° is passed to the second 3×3 Butler matrix 5. After the signal ½∠0° is passed through the second 3×3 Butler matrix 5, the signals of the first output port out1, the fifth output out5 and the third output port out3 of the 5×6 Butler matrix are respectively ⅙∠0°, ⅙∠+120°, ⅙∠+240°. Therefore, if the signal is input from the fourth input port in4, the signals of the first to sixth input ports are respectively ⅙∠0°, ⅙∠−60°, ⅙∠+240°, ⅙∠+180°, ⅙∠+120°, ⅙∠+60°. The amplitudes of the powers allocated to the adjacent output ports are the same, is ⅙, and the difference of phases of the powers allocated to the adjacent output ports is −60°.

If radio-frequency signal is input from the fifth input port in5, the signal is firstly passed through the fourth directional coupler 1 and the fourth fixed phase shifter 6 and then is divided into two outputs after being passed through the fourth directional coupler 1 and the fourth fixed phase shifter 6. The signal of the first output end 1d of the fourth directional coupler 1 is ½∠0°. After the signal ½∠0° is passed through the fourth fixed phase shifter 6, the signal is ∠+30°. The signal ∠+30° is passed to the first 3×3 Butler matrix 4. After the signal ∠+30° is passed through the first 3×3 Butler matrix 4, the signals of the second output port out2, the sixth output port out6 and the fourth output port out4 of the 5×6 Butler matrix are respectively ⅙∠+30°, ⅙∠+150°, ⅙∠+270°. The signal of the second output end 1c of the fourth directional coupler 1 is ½∠−90°. The signal ½∠−90° is passed to the second 3×3 Butler matrix 5. After the signal ½∠−90° is passed through the second 3×3 Butler matrix 5, the signals of the first output port out1, the fifth output out5 and the third output port out3 of the 5×6 Butler matrix are respectively ⅙∠−90°, ⅙∠+30°, ⅙∠+150°. Therefore, if the signal is input from the fifth input port in5, the signals of the first to sixth input ports are respectively ⅙∠−90°, ⅙∠+30°, ⅙∠+150°, ⅙∠+270°, ⅙∠+30°, ⅙∠+150°. The amplitudes of the powers allocated to the adjacent output ports are the same, is ⅙, and the difference of phases of the powers allocated to the adjacent output ports is +120°.

Figure 9:
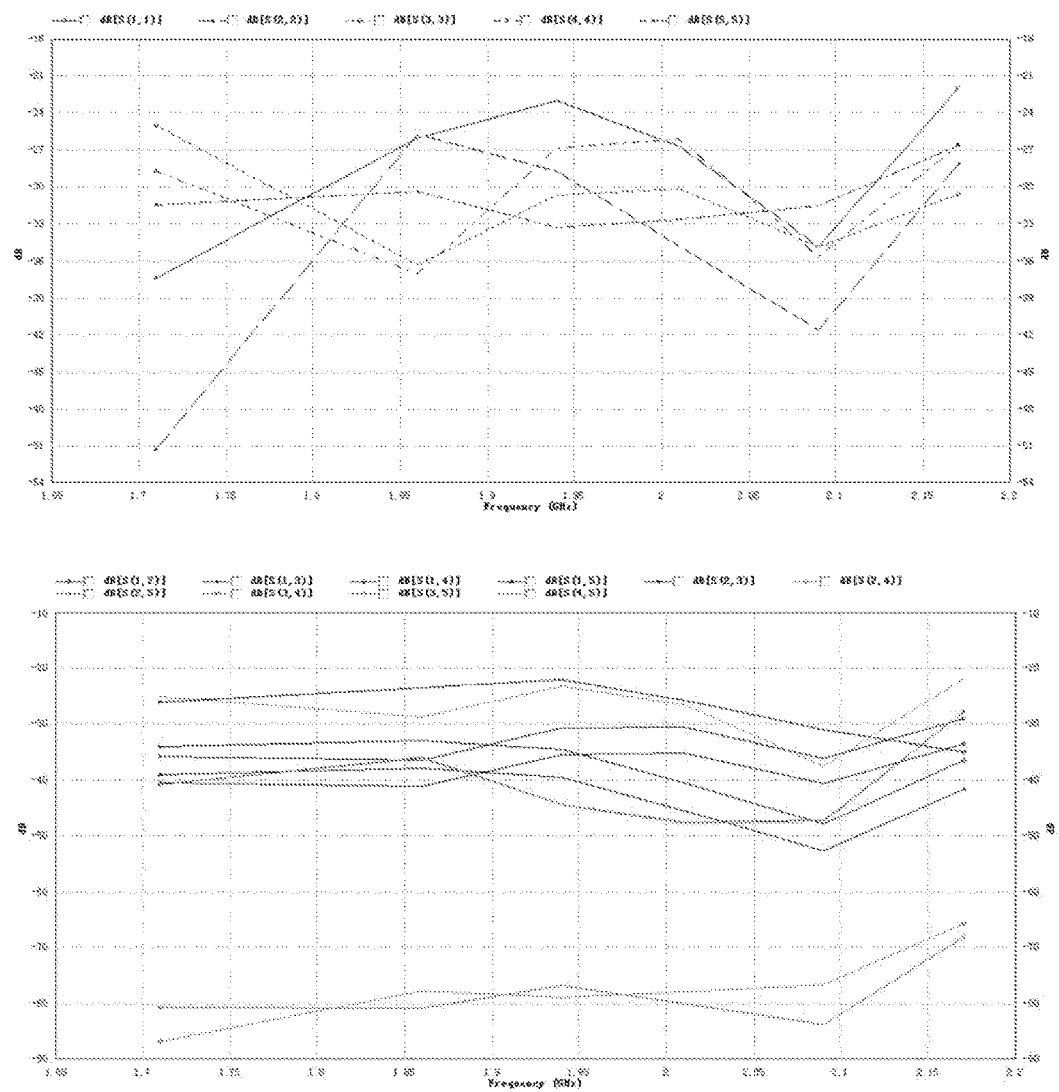
FIG. 9 is a simulation result chart of S parameter of Embodiment Two of the invention.

FIGS. 9 to 11 are IE3D simulation results of the embodiment of the invention. In the process of simulation, the cables between nodes a, b, c, d, e, f and the first to third input ports of the first 3×3 Butler matrix 4 and the first to third input ports of the second 3×3 Butler matrix 5 are replaced by 50 ohm transmission lines. The ports 1, 2, 3, 4, 5 are respectively corresponding to the first to fifth input ports, and the ports 6, 7, 8, 9, 10, 11 are respectively corresponding to the first to sixth output ports. As seen from figures, the return losses of the five beam ports of the first to fifth input ports are below −22 dB within broadband band 1710-217 MHz and the isolations between the first to fifth input ports are above 22 dB within the working frequency. When the signal is input from the first input port in1, the difference of phases of the adjacent ports of the first to sixth output ports within the working frequency is within the range of 0°±2°, the amplitudes are all within the range of −8.1±0.5 dB and the losses are below 0.5 dB. When the signal is input from the second input port in2, the difference of phases of the adjacent ports of the first to sixth output ports within the working frequency is within the range of +60°±4.5°, the amplitudes are all within the range of −8.15±0.22 dB and the losses are below 0.5 dB. When the signal is input from the third input port in3, the difference of phases of the adjacent ports of the first to sixth output ports within the working frequency is within the range of −120°±2°, the amplitudes are all within the range of −8.15±0.22 dB and the losses are below 0.5 dB. When the signal is input from the fourth input port in4, the difference of phases of the adjacent ports of the first to sixth output ports within the working frequency is within the range of −60°±2°, the amplitudes are all within the range of −8.07±0.4 dB and the losses are below 0.5 dB. When the signal is input from the fifth input port in5, the difference of phases of the adjacent ports of the first to sixth output ports within the working frequency is within the range of +120°±2°, the amplitudes are all within the range of −8.22±0.52 dB and the losses are below 0.5 dB.

Five antenna arrays may be connected to the output ports of the 5×6 Butler matrix provided by the embodiment of the invention for generating five beams of different orientation at the five input ports.

The above embodiments are only several embodiments of the invention. The descriptions thereof are more particular and detailed but they should not be understood as limitations to the scope of the invention. It is noted that several variations and improvements may also be made to those ordinary skills in the art without departing the concept of the invention which all fall within the protection scope of the invention. Therefore, the protection scope of the invention should be subject to the appended claim.

What is claimed is:

1. A beamforming network comprising two 3×3 Butler matrixes, respectively a first 3×3 Butler matrix and a second 3×3 Butler matrix, wherein, the first 3×3 Butler matrix and the second 3×3 Butler matrix each comprises a first directional coupler, a second directional coupler, a third directional coupler, a first fixed phase shifter, a second fixed phase shifter and a third fixed phase shifter, wherein each directional coupler has two input ends and two output ends, respectively a first input end, a second input end, a first output end and a second output end;

the first 3×3 Butler matrix and the second 3×3 Butler matrix each has three input ports and three output ports, respectively a first input port, a second input port, a third input port, a first output port, a second output port and a third output port;

the second input end of the second directional coupler is connected to the first input port, the second input end of the first directional coupler is connected to the second input port, the first input end of the first directional coupler is connected to the third input port, the first output end of the first directional coupler is connected to the first input end of the third directional coupler via the first fixed phase shifter, the second output end of the first directional coupler is connected with the first input end of the second directional coupler, the first output end of the second directional coupler is connected with the second input end of the third directional coupler, the second output end of the second directional coupler is connected to the first output port via the third fixed phase shifter, the second output end of the third directional coupler is connected to the second output port via the second fixed phase shifter, the first output end of the third directional coupler is connected to the third output port;

the transfer phase of the first fixed phase shifter is delayed by 90 degrees with respect to a phase shift delay from the first input end to the first output end of the second directional coupler, the transfer phase of the second fixed phase shifter is delayed 90 degrees with respect to that from the first output end of the third directional coupler to the third output port, and the transfer phase of the third fixed phase shifter is delayed 90 degrees with respect to that from the first output end of the second directional coupler to the second output port;

the beamforming network further comprising a fourth directional coupler, a fifth directional coupler, a power divider, a fourth fixed phase shifter and a fifth fixed phase shifter, wherein each directional coupler has two input ends and two output ends, respectively a first input end, a second input end, a first output end and a second output end, the power divider has an input end, a first output end and a second output end;

the beamforming network has five input ports and six output ports, respectively a first to fifth input ports and a first to sixth output ports;

the input end of the power divider is connected to the first input port of the beamforming network, the second output end of the power divider is connected to the first input end of the second 3×3 Butler matrix, the first output end of the power divider is connected to the first input end of the first 3×3 Butler matrix, the second input end of the fifth directional coupler is connected to the second input port of the beamforming network, the first input end is connected to the third input port of the beamforming network, the second output end is connected to the second input end of the second 3×3 Butler matrix, the first output end is connected to the second input end of the first 3×3 Butler matrix via the fifth fixed phase shifter, the second input end of the fourth directional coupler is connected to the fourth input port of the beamforming network, the first input end is connected to the fifth input port of the beamforming network, the second output end is connected to the third input end of the second 3×3 Butler matrix, the first output end is connected to the third input end of the first 3×3 Butler matrix via the fourth fixed phase shifter, the first output end, the second output end and the third output end of the second 3×3 Butler matrix are respectively connected to the first output port, the fifth output port and the third output port of the beamforming network, the first output end, the second output end and the third output end of the first 3×3 Butler matrix are respectively connected to the second output port, the sixth output port and the fourth output port of the beamforming network;

the fourth fixed phase shifter is a 30° advanced phase shifter, and the fifth fixed phase shifter is a 150° advanced phase shifter.

2. The beamforming network according to claim 1, wherein the first input ends and the first output ends of the fourth directional coupler and the fifth directional coupler are distributed at same sides, and the second input ends and the second output ends are distributed at the same sides;

the fourth directional coupler and the fifth directional coupler are both directional couplers with equal power division having 90 degree phase shift characteristics, a power equal to half of the power of an input signal is allocated to output ends of the fourth directional coupler and the fifth directional coupler;

when any input end of the fourth or fifth directional coupler is fed, the transfer phase of the output end thereof at the opposite side is delayed 90 degree with respect to that of the other output end of the same side.

3. The beamforming network according to claim 1, wherein the fourth directional coupler and the fifth directional coupler are branch-line couplers or coupled-line couplers.

4. The beamforming network according to claim 1, Wherein the power divider is an equipower and equiphase power divider.

* * * * *